(12) United States Patent
Noguchi (10) Patent No.: US 11,091,356 B2
(45) Date of Patent: Aug. 17, 2021

(54) ALIGNMENT APPARATUS OF CONTAINER

(71) Applicant: TOSHIBA MITSUBISHI-ELECTRIC INDUSTRIAL SYSTEMS CORPORATION, Chuo-ku (JP)

(72) Inventor: Hideo Noguchi, Chuo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 218 days.

(21) Appl. No.: 16/479,058

(22) PCT Filed: Jan. 20, 2017

(86) PCT No.: PCT/JP2017/001918
§ 371 (c)(1),
(2) Date: Jul. 18, 2019

(87) PCT Pub. No.: WO2018/134963
PCT Pub. Date: Jul. 26, 2018

(65) Prior Publication Data
US 2019/0367337 A1  Dec. 5, 2019

(51) Int. Cl.
*B66C 13/48* (2006.01)
*B65G 67/24* (2006.01)
(Continued)

(52) U.S. Cl.
CPC .............. *B66C 13/48* (2013.01); *B65G 67/24* (2013.01); *G01B 11/14* (2013.01); *B66C 19/002* (2013.01);
(Continued)

(58) Field of Classification Search
CPC ....... B66C 13/48; B66C 13/46; B66C 19/007; B66C 19/002; G01B 11/14; G01B 21/00; B65G 67/24; G01C 21/10; G01C 21/165
See application file for complete search history.

(56) References Cited

U.S. PATENT DOCUMENTS

2005/0173364 A1* 8/2005 Spohler .................... B66C 1/00
                                                          212/270
2014/0107971 A1* 4/2014 Engedal ................ G01B 21/00
                                                          702/150

FOREIGN PATENT DOCUMENTS

JP          5314796 B1    10/2013

OTHER PUBLICATIONS

International Search Report dated Apr. 11, 2017 in PCT/JP2017/001918 filed Jan. 20, 2017.

* cited by examiner

*Primary Examiner* — Tarun Sinha
*Assistant Examiner* — Lal C Mang
(74) *Attorney, Agent, or Firm* — Xsensus LLP (57) ABSTRACT

An alignment apparatus of a container configured to an alignment of a container smoothly by using a manual operation and an automatic operation together is provided. The alignment apparatus includes a first calculator performing calculation measuring a position of the container based on a detection result of a position sensor, a second calculator performing calculation measuring a target position based on the detection result of the position sensor, the target container being placed on the target position, a third calculator calculating and setting a first automatic operation region performing the automatic operation based on a position of the container and a second automatic operation region performing the automatic operation based on the target position, respectively, a first signal generating part detecting overlapping of the first automatic operation region and the second automatic operation region, and generating a first speed reference signal so as to coincide the position of the container with the target position, and a second signal generating part generating a second speed reference signal (Continued)

for moving the container based on a manual control signal generated by an operation of an operator.

6 Claims, 8 Drawing Sheets

(51) Int. Cl.
*G01B 11/14* (2006.01)
*B66C 19/00* (2006.01)
*G01C 21/10* (2006.01)
*G01B 21/00* (2006.01)
*G01C 21/16* (2006.01)

(52) U.S. Cl.
CPC ............ *B66C 19/007* (2013.01); *G01B 21/00* (2013.01); *G01C 21/10* (2013.01); *G01C 21/165* (2013.01)

ALIGNMENT APPARATUS OF CONTAINER

TECHNICAL FIELD

The embodiment of the invention relates to an alignment apparatus of a container.

BACKGROUND ART

In a conventional alignment of container pile up, an operator perceives a height and a position of the piled up container from a driving room in a trolley by visual inspection. The operator adjusts a height of a spreader grasping the container to be piled up by winding operation of a rope, moves transversely the trolley, and transfers to an upper portion of the target container to pile up the container.

The operator may pile up onto the container or unload to a truck chassis by performing the winding operation of the rope and the transverse operation of the trolley from a remote operation room based on an image of a camera other than the visual inspection.

However, a number of the cameras is limited in the case of the remote control, depending on an installation position and an angle of the cameras, it may be hard to see the position of the target container and hard to get perspective. For that reason, the pile up operation by the remote control may need a working time longer than the pile up operation by the visual operation from the driving room.

The patent document 1 discloses a method for measuring more accurately the position of the container and the position of the spreader by using a laser range finder. However, it is required to perform by the visual operation of the operator from considering safety in the pile up work of heavy items like the container.

In a technique about automation of the container alignment, a manual operation and an automatic operation are clearly distinguished. For example, when trying to perform the manual operation in performing the alignment by the automatic operation, it is set to stop the automatic operation to switch to the manual operation. In this method, it is difficult to make fine adjustments of the position of the container by the manual operation while performing automatic operation. Since the automatic operation stops completely when performing the manual operation, switching is not smooth and the operator may feel stressed. Also in the case where the automatic operation starts during the manual operation, a jerky movement is caused so as to disturb the operator's operation.

PRIOR ART DOCUMENT

Patent Document

[Patent Document 1] Japanese Patent No. 5314796

SUMMARY OF INVENTION

Problem to be Solved by Invention

The embodiments provide an alignment apparatus of a container, which the alignment of the container can be performed smoothly by using the manual operation and the automatic operation together.

Means for Solving Problem

According to one embodiment of the invention, an alignment apparatus of a container performs an alignment of the container by using a manual operation by an operator and an automatic operation without the operator together. The apparatus includes a first calculator, a second calculator, a third calculator, a first signal generating part, and a second signal generating part. The first calculator performs calculation measuring a position of the container based on a detection result of a position sensor. The second calculator performs calculation measuring a target position based on the detection result of the position sensor. The target container is placed on the target position. The third calculator calculates and sets a first automatic operation region performing the automatic operation based on a position of the container and a second automatic operation region performing the automatic operation based on the target position, respectively. The first signal generating part detects overlapping of the first automatic operation region and the second automatic operation region, and generates a first speed reference signal so as to coincide the position of the container with the target position. The second signal generating part generates a second speed reference signal for moving the container based on a manual control signal generated by an operation of an operator. A third speed reference signal is generated based on outputs of the first signal generating part and the second signal generating part, and the third speed reference signal is supplied to a drive unit moving the container.

Effect of Invention

The embodiment provides an alignment apparatus of a container configured to an alignment of a container smoothly by using a manual operation and an automatic operation together.

EMBODIMENTS OF INVENTION

Embodiments of will be described with reference to the drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1:
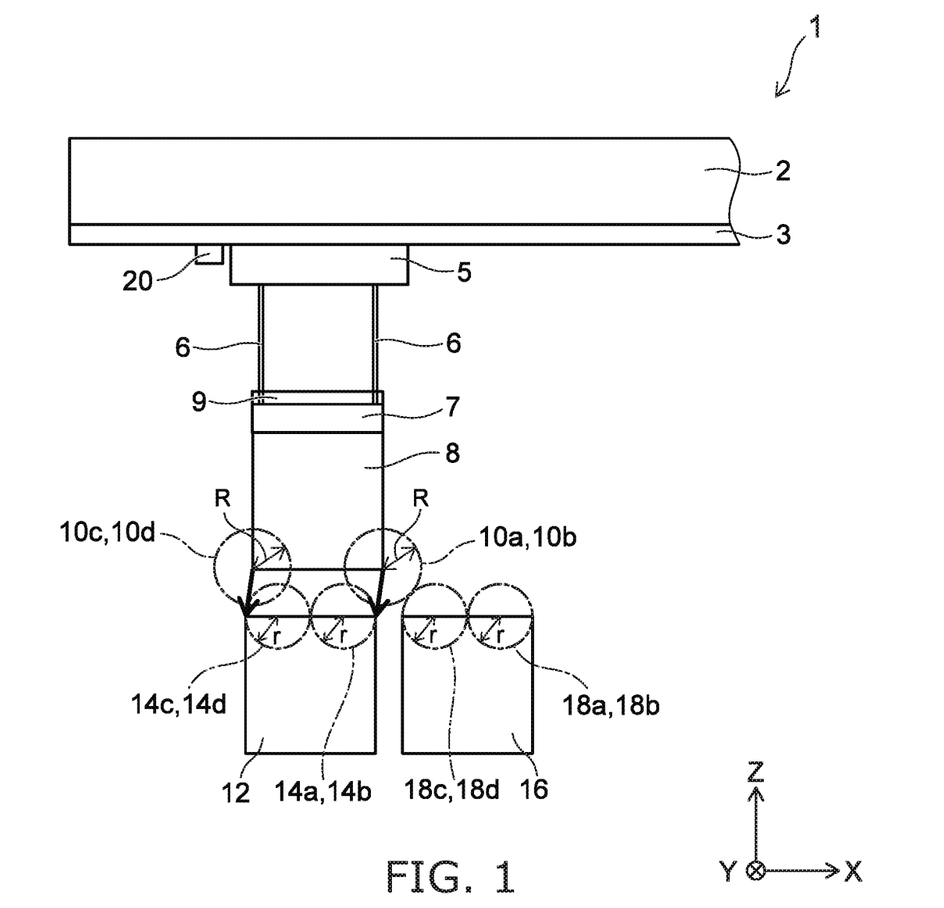
FIG. 1 is a schematic view illustrating a container crane.

FIG. 1 is a schematic view illustrating a container crane.

Figure 2:
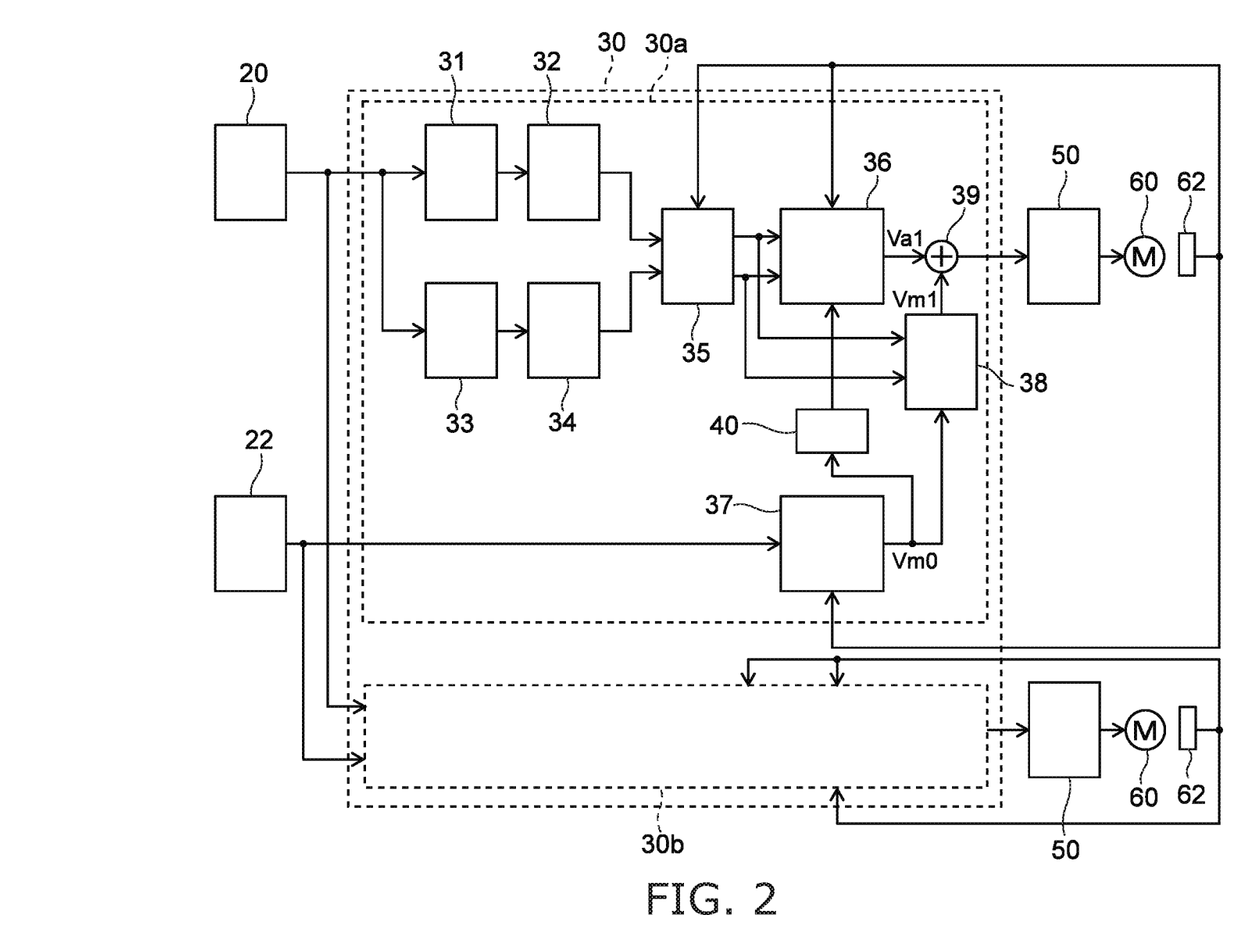
FIG. 2 is a block diagram illustrating an alignment apparatus of a position of the container according to a first embodiment.

FIG. 2 is a block diagram illustrating an alignment apparatus of a position of the container according to the embodiment.

As shown in FIG. 1, a container crane 1 includes a trolley 5 moving transversely along a girder 3 provided on a lower side of a boom 2. The trolley 5 suspends a spreader 7 via a rope 6 and a head block 9. A container 8 is suspended via the spreader 7.

In the following description, a direction in which the trolley 5 moves transversely is taken as an X-axis direction. The trolley 5 is supported on the ground (plane surface) by a support of the container crane 1 not shown. The support of the container crane 1 can travel on a rail provided along a Y-axis direction orthogonal to the X-axis. It is assumed that the container crane 1 is placed on the plane surface including the X-axis and the Y-axis and the container 8 is suspended along a Z-axis direction orthogonal to the X-axis and the Y-axis.

In the case where the container crane 1 is a gantry crane or the like which is large crane and is used for cargo handling in a harbor, the direction of the Y-axis is a direction aligned with the wharf, and a direction of the X-axis is a direction in which the boom 2 stretches. The container crane 1 is not limited to the gantry crane, and may be a small type crane for cargo handling, and may be other container crane.

The container (self-container) 8 suspended by the spreader 7 is piled up on other containers (target targets) 12, 16. The target containers 12, 16 are arranged in this order so that a short side is aligned with the X-axis. The self-container 8 is piled up on the desired target container 12 of the target containers 12, 16 by the transverse movement of the trolley along the X-axis.

A distance sensor 20 is provided, for example, on the boom 2 and the girder 3. The distance sensor 20 is placed at a diagonally above position to the containers 8, 12, 16 so as to enable to measure the positions of the containers 8, 12, 16. If the positions of the containers 8, 12, 16 can be measured, the distance sensor 20 may be provided at other positions. For example, the distance sensor 20 may be provided at a tip etc. of the boom 2. In the alignment apparatus of the container of the embodiment, the position of a lower end of the suspended self-container 8 is sensed by the distance sensor 20. The position of the lower end of the container 8 can be set arbitrarily, but is coordinates of four corners of a rectangle forming a lower surface of the container 8 in the following example.

The distance sensor 20 senses a position where the self-container 8 is piled up. In the case of piling up on the upper portion of the target container 12, a position of the target container 12 is sensed. The position of the upper end of the target container 12 can be set arbitrarily, but the position of the upper end of the target container 12 is coordinates of four corners of a rectangle forming an upper surface of the target container 12.

In the case where the alignment apparatus of the container includes multiple containers which are targets to be piled up, positions of upper ends of the target containers 12, 16 are sensed.

The position of the sensed self-container 8 and the positions of the target containers 12, 16 are stored by the alignment apparatus 30 of the container. Hereinafter, it is assumed that the position of the self-container 8 is coordinates of four corners of the lower surface and the positions of the target containers 12, 16 are coordinates of four corners of the upper surface.

The distance sensor 20 is, for example, a laser range finder. The laser range finder scans laser light in the X-axis direction and the Y-axis direction toward an object, and measures a distance to the object by a time when reflection light is received and phase etc. of the reflection light.

The alignment apparatus of the container generates automatic operation regions 10a to 10d based on the position of the piled up self-container 8. In this example, the automatic operation regions 10a to 10d are set as regions in spherical surfaces of a radius R having the coordinate of corners of the lower surface of the self-container 8 as the center.

The alignment apparatus of the container generates automatic operation regions 14a to 14d, 18a to 18d based on the positions of the target containers 12, 16. In this example, the automatic operation regions 14a to 14d, 18a to 18d are set as regions in hemispherical surfaces of a radius r contacting adjacent sides orthogonal to the rectangle of the upper surfaces of the containers 12, 16.

In the case where the automatic operation regions 10a to 10d of the self-container 8 overlap the automatic operation regions 14a to 14d of the target container 12, respectively, or overlap the automatic operation regions 18a to 18d of the target container 16, respectively, the automatic operation starts.

In the case where the automatic operation regions 10a to 10d of the self-container 8 overlap the automatic operation regions 14a to 14d of the target container 12, respectively, the alignment apparatus of the container controls a drive unit so that the position of the self-container 8 coincides with the position of the target container 12. The drive unit includes an electric motor. The electric motor controls winding and rewinding of the rope 6 to drive the self-container 8 in the Z-axis direction. The electric motor converts a rotation motion to a horizontal direction motion by a drum or a rope or the like to control the transverse notion of the trolley 5.

In the case where the automatic operation regions of the self-container 8 overlap the automatic operation regions 18a to 18d, respectively, the alignment apparatus of the container controls the drive unit so that the position of the self-container 8 coincides with the position of the target container 16. The drive unit moves the self-container 8 in the X-axis direction and the Z-axis direction according to an output of the alignment apparatus of the container.

The alignment apparatus of the container can perform the manual operation smoothly by using a manual controller at the operator's hand even when performing the manual operation.

When the operator operates a lever of a manual controller at a speed faster than a predetermined speed, the operator can stop the automatic operation and can perform the alignment of the self-container 8 by the manual operation. An operation direction of the lever at this time can be a reverse direction to moving direction by the automatic operation.

The configuration of the alignment apparatus of the container (hereinafter, simply referred to as the alignment apparatus) 30 will be described with reference to FIG. 1 and FIG. 2.

As shown in FIG. 2, the alignment apparatus 30 is connected to the distance sensor 20 and the manual controller 22, respectively. The output of the alignment apparatus 30 is connected to an electric motor drive unit 50. The electric motor drive unit 50 is connected to the electric motor 60, and the electric motor 60 rotates according to a drive output outputted by the electric motor drive unit 50. The alignment apparatus 30 generates a speed reference signal setting rotation speed and a rotation direction of the electric motor 60 according to the outputs of the distance sensor 20 and the manual controller 22, and supplies to the electric motor drive unit 50.

The alignment apparatus 30 includes a control circuit 30a on the X-axis and a control circuit 30b on the Y-axis. The control circuit 30a controls the action of transverse movement of the trolley 5. The control circuit 30b controls the winding and rewinding of the rope 6. The control circuits 30a, 30b of the embodiment have the same configuration. Hereinafter, the configuration of the control circuit 30a will be described.

In the alignment apparatus 30 of the embodiment, it is assumed that alignment of the transverse position (X-axis direction) of the trolley 5 and the hanging height (Z-axis direction) of the container is performed. In the embodiment described below, it is assumed that the alignment of the container is not performed as to the movement (Y-axis direction) on a rail of a travelling device or the like. The alignment apparatus can perform the container in three directions of XYZ by preparing a control circuit similar to the control circuits 30a, 30b also about the Y-axis.

The manual controller 22 has, for example, a lever corresponding to the X-axis direction and a lever corresponding to the Z-axis, although not shown. The manual controller 22 generates electrical signals corresponding to the direction and the speed of the transverse movement of the trolley 5 to output by operating the lever corresponding to the X-axis direction. The manual controller 22 generates electrical signals corresponding to the direction and the speed of winding the rope 6 to output by operating the lever corresponding to the Z-axis direction.

The control circuit 30a includes a position measuring part 31 of the self-container, a calculator 32 for the automatic operation regions of the self-container, a position measuring part 33 of the target position, a calculator 34 for the automatic operation regions of the target position, a determination part 35 for start of the automatic operation, a calculator 36 generating an automatic operation speed reference signal, a calculator 37 generating a manual operation speed reference signal, and an adder 39.

The position measuring part 31 is connected to an output of the distance sensor 20. The position measuring part 31 measures the position of the self-container 8 based on the output of the distance sensor 20. The position of the self-container 8 is coordinates of four corners on the lower surface of the self-container 8, in this example. The position measuring part 31 stores the measured position of the self-container 8 as an initial position.

The calculator 32 for the automatic operation region is connected to an output of the position measuring part 31. The calculator 32 generates the automatic operation regions 10a to 10d based on the position of the self-container 8. The automatic operation regions 10a to 10d are generated to correspond to four corners on the lower surface of the self-container 8, respectively. The automatic operation regions 10a to 10d are generated so that the spherical surface having each coordinate of four corners as the center is a boundary. The automatic operation regions 10a to 10d are set inside these spherical surfaces. The radius of all spherical surfaces is R. The automatic operation regions 10a to 10d may be spherical surfaces having the same radius in this way, and may be spherical surfaces having different radius from a part or all of four coordinates.

The position measuring part 33 is connected to the output of the distance sensor 20. The position measuring part 33 measures the position of the target container 12 based on the output of the distance sensor 20. In the case where multiple target containers are arranged aligned with the X-axis direction, the position measuring part 33 measures the positions of all target containers 12, 16. Although the detail is described later, in the alignment apparatus 30, the self-container 8 is firstly brought closer to the target container by the manual operation. When the predetermined condition is satisfied, the alignment apparatus 30 automatically selects one target container from the multiple target containers 12, 16, and acts so that the position of the self-container 8 and the position of the selected target container coincide. The predetermined condition is the case where regions of the automatic operation regions 10a to 10d of the self-container 8 overlap the automatic operation regions of the target containers, respectively.

The calculator 34 is connected to an output of the position measuring part 33. The calculator 34 generates the automatic operation regions 14a to 14d based on the target position. The automatic operation regions 14a to 14d are generated to correspond to four corners on the upper surface of the target container 12. The automatic operation regions 14a to 14d are formed so that the hemispherical surface contacting adjacent crests forming each of four corners is a boundary. The automatic operation regions 14a to 14d are set inside these hemispherical surfaces. The radius of all hemispherical surfaces is r. In the case of multiple target containers, the automatic operation regions 18a to 18d are formed to correspond to four corners on the upper surface of other target container 16. Since the multiple target containers are arranged almost without gaps, the automatic operation regions are formed not so as to overlap the automatic operation regions of the adjacent containers.

The automatic operation regions generated by the calculators 32, 34 are not limited to the spherical surface and the hemispherical surface described above, and may be cube-shaped, rectangle-shaped, and cylindrical-shaped or the like. The automatic operation regions are not limited to the case of being formed on each of four corners, and, for example, two automatic operation regions are formed from one container so as to include the adjacent corners.

The determination part 35 detects whether the respective four automatic operation regions of the self-container 8 and the target containers 12, 16 overlap or not. In this example, the determination part 35 detects transverse movement distance of the trolley 5 based on a rotation number of the electric motor 60 detected by a resolver attached to the electric motor 60. The alignment apparatus 30 calculates the automatic operation regions 10a to 10d of the self-container 8 and the automatic operation regions 14a to 14d, 18a to 18d of the target position based on the initial position of the self-container 8 and the position of the target container. The determination part 35 determines whether the automatic operation regions 10a to 10d overlap one of the automatic operation regions 14a to 14d or the automatic operation regions 18a to 18d. When all of the automatic operation regions 10a to 10d overlap the automatic operation regions 14a to 14d, respectively, the determination part 35 selects the target container 12 as the target position. When all of the automatic operation regions 10a to 10d overlap the automatic operation regions 18a to 18d, respectively, the determination part 35 selects the target container 16 as the target position.

The calculator 36 generating the automatic operation speed reference generates a speed reference signal Va0 so that the position of the self-container 8 coincides with the position of the selected target container. The calculator 36 may generates a speed reference signal Va1 by multiplying the generated speed reference signal Va0 by a predetermined coefficient α. In the following, unless otherwise noted, Va1 is used for the speed reference signal corresponding to the automatic operation.

The calculator 37 generating the automatic operation speed reference is connected to an output of the manual controller 22. The calculator 37 generates a speed reference signal Vm0 based on a manual control signal representing a speed in the X-axis direction outputted from the manual controller and its direction.

The speed reference signal corresponding to the manual operation is generated to be inversely proportional to a distance LX between the position of the self-container 8 and the position of the target container favorably by a distance calculator 38. In this example, the distance calculator 38 is connected to outputs of the determination part 35 and the calculator 37. The distance calculator 38 sets a ratio of the manual operation by the distance LX between the position of the self-container 8 outputted from the determination part 35 and the target position.

$$Vm1 = \beta \times Vm0 / LX \quad (1)$$

Here, β is a constant.

The speed reference signal Vm0 at the manual operation is modified in such a way as the formula (1), and thus the influence of the manual operation can be strengthened as the position of the self-container 8 approaches the target position.

The speed reference signal Va1 is added to the speed reference signal Vm1 and supplied to the electric motor drive unit 50. The electric motor drive unit 50 generates a drive signal according to the speed reference signal (Va1+Vm1) and drives the electric motor 60.

Arbitrary constants α, β are set in advance. These values are adequately set, and thus when the manual operation is performed during the automatic operation, or when the automatic operation starts during the manual operation, the action of the alignment apparatus 30 can be smoother.

An acceleration detector 40 is connected to the output of the calculator 37. The acceleration detector 40 outputs a disable signal in the case where a speed change in the manual operation, that is, the acceleration is larger than a predetermined value. The disable signal is inputted to the calculator 36. The calculator stops the action when the disable signal is inputted. The case where the acceleration becomes larger than the predetermined value means the case where the operation of the manual controller 22 is performed rapidly, and corresponds to the case where the operator tries to stop forcibly the automatic operation after the automatic operation starts.

In this way, according to the alignment apparatus 30, the alignment of the container can be performed smoothly by use of the automatic operation and the manual operation together.

The action of the alignment apparatus of the container of the embodiment will be described.

Figure 3A:
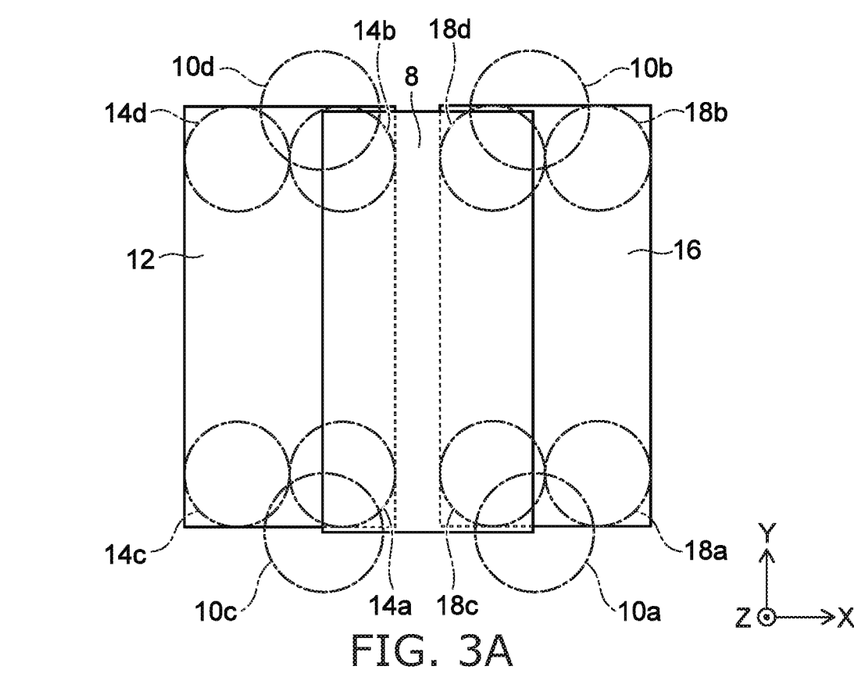
FIG. 3A and FIG. 3B are conceptual views for describing the action of the alignment apparatus of the container of the first embodiment.
Figure 3B:
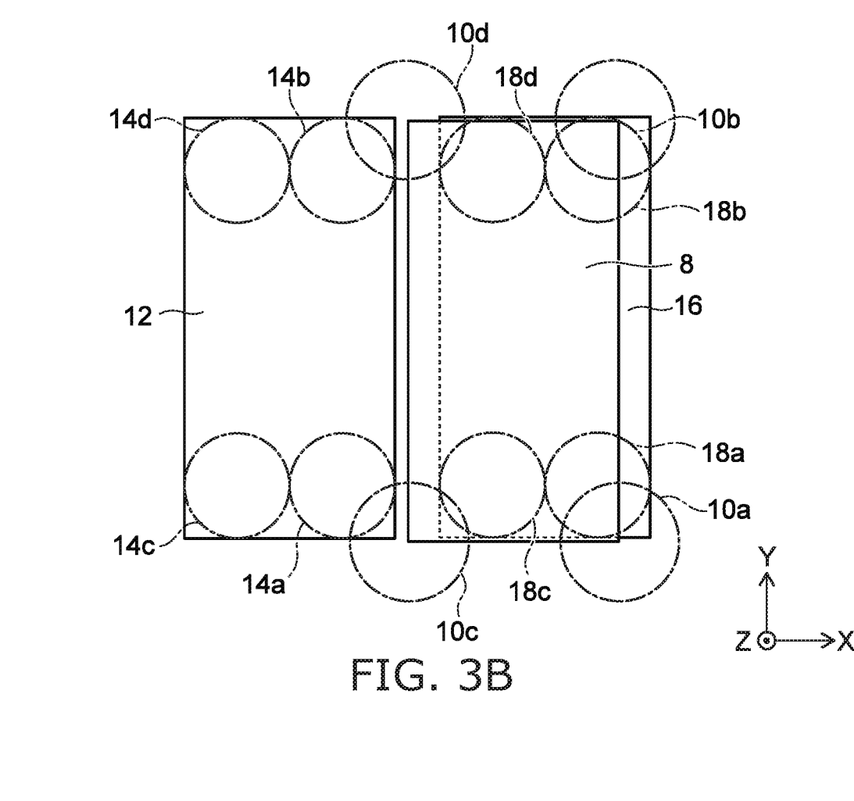

FIG. 3A and FIG. 3B are conceptual views for describing the action of the alignment apparatus of the embodiment.

Figure 4:
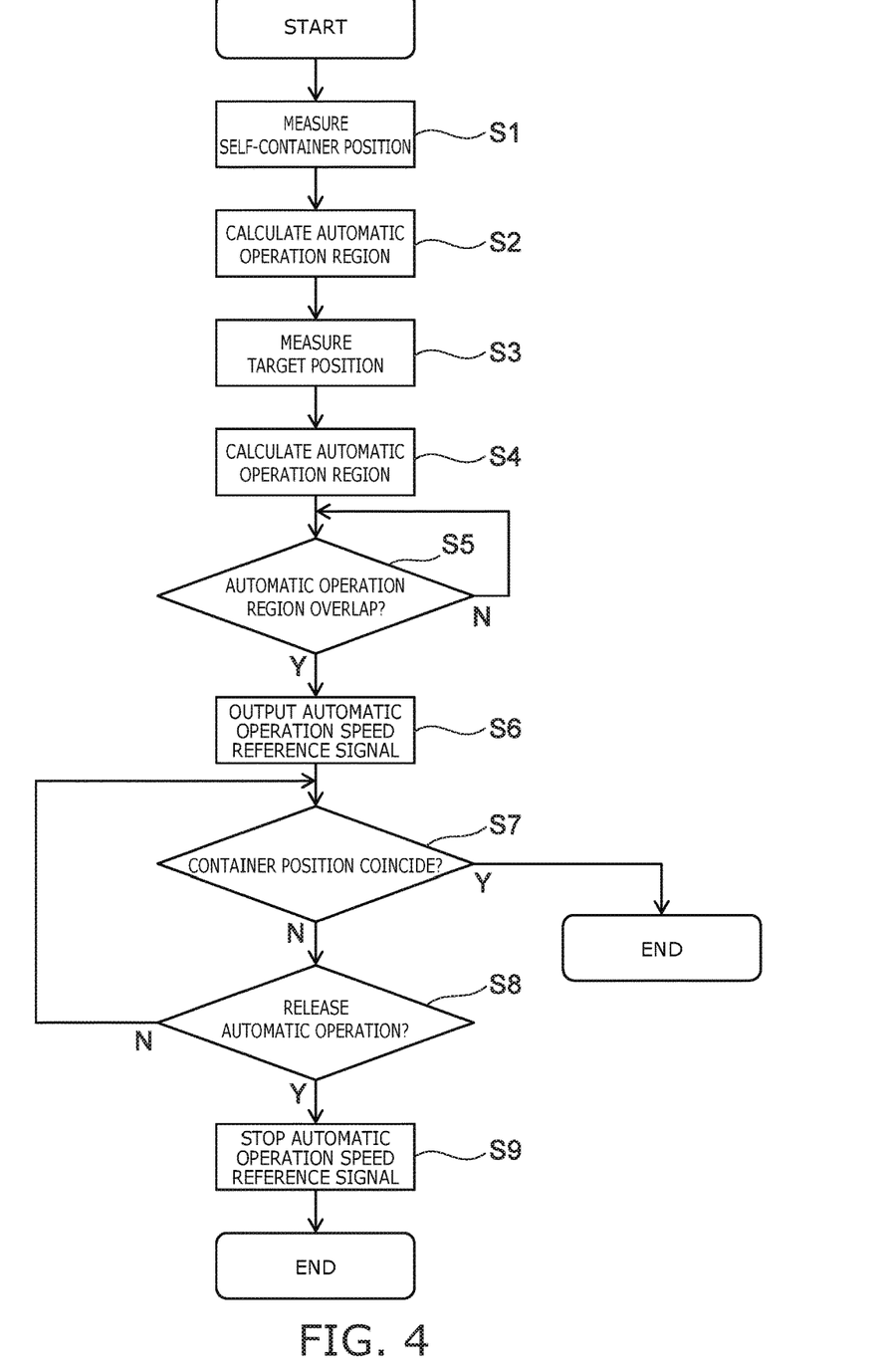
FIG. 4 is an example of a flow chart for describing the action of the alignment apparatus of the container of the first embodiment.

FIG. 4 is a flow chart for describing the action of the alignment apparatus of the container of the embodiment.

FIG. 3A and FIG. 3B show plan views of the self-container 8 and the target containers 12, 16 viewed from above. In FIG. 3A, the self-container 8 is located almost in the middle between the two target containers 12, 16. The automatic operation regions 10c, 10d of the self-container 8 overlap the automatic operation regions 14a to 14d of the one target container 12. The automatic operation regions 10a, 10b of the self-container 8 overlap the automatic operation regions 16a to 16d of the other target container 16. That is, the automatic operation regions 10a to 10d of the self-container 8 do not overlap the automatic operation regions of any of the target containers, respectively. In such a case, the automatic operation of the alignment apparatus 30 does not start, and the operator moves the self-container 8 to one target container 12 or the other target container 16 by using the manual controller 22.

In FIG. 3B, the automatic operation regions 10c, 10d of the self-container 8 overlap the automatic operation regions 14a, 14d of the one target container 12. The automatic operation regions 10a to 10d of the self-container 8 overlap all automatic operation regions 18a to 18d of the other target container 16, respectively. The alignment apparatus 30 selects the other target container 16 as the target of the automatic operation, and starts the automatic operation.

The action of the alignment apparatus 30 will be described more specifically by using the flow chart of FIG. 4.

In a step S1, the position measuring part 31 measures the position of the self-container 8 based on the output of the distance sensor 20. The position measuring part 31 stores the measured position of the self-container as the initial position.

In a step S2, the calculator 32 generates the automatic operation regions 10a to 10d based on the initial position of the self-container 8. The calculator 32 stores the generated automatic operation regions 10a to 10d.

In a step S3, the position measuring part 33 measures the positions of the target containers 12, 16 based on the output of the distance sensor 20. The position measuring part 33 stores the measured positions of the target containers 12, 16.

In a step S4, the calculator 34 generates the automatic operation regions 14a to 14d, 18a to 18d, respectively based on the positions of the target containers 12, 16. The calculator 34 stores the generated automatic operation regions 14a to 14d, 18a to 18d.

In a step S5, the determination part 35 determines whether the automatic operation regions 10a to 10d overlap the automatic operation regions of the any of the target containers 12, 16 or not, respectively. When overlapping, the determination part 35 transitions to a next step S6, and when not overlapping, stands by until the overlap is detected.

In a step S6, the determination part 35 transmits data of the position of the self-container 8 and the target position to the calculator 36, and starts the calculator 36. The calculator 36 generates the speed reference signal so that the position of the self-container 8 coincides with the target position. The speed reference signal Va1 for the automatic operation is added to the speed reference signal Vm1 for the manual operation. The added speed reference signal is supplied to the electric motor drive unit 50.

Even if the automatic operation does not start, the calculator 37 outputs the speed reference signal Vm0 for the manual operation according to the signal inputted from the manual controller 22. The speed reference signal Vm0 at this time is equal to Vm1.

In a step S7, the calculator 36 and the calculator 37 determines whether the position of the self-container 8 coincides with the target position or not based on the calculation results and the output of the resolver 62. In the case where the position of the self-container 8 coincides with the target position, a process is finished. In the case where the position of the self-container 8 does not coincide with the target position, the process transits to a next step S8.

In a step S8, the calculator 36 determines whether the disable signal from the acceleration detector 40 is detected or not. When the disable signal is detected, the calculator 36 stops the action in a step S9. When the disable signal is not detected, the calculator 36 returns to the process of the step S7.

When the automatic operation is stopped, the alignment apparatus 30 performs the alignment of the container by the manual operation by the manual controller 33.

The alignment apparatus 30 described above may be configured by CPU (Central Processing Unit) and MPU (Micro-Processing Unit) or the like which load a program and operate according each step of the program, and a storage part such as a memory element or the like which stores the program. In such a case, a portion or all of the respective control circuits 30a, 30b of the alignment apparatus 30 are performed as a portion or whole of the program.

The alignment apparatus 30 may be realized by PLC (Programmable Logic Controller). PLC performs a portion or all of the control circuits 30a, 30b as a portion or whole of a ladder program stored in a storage device such as a memory or the like, for example.

The effects of the alignment apparatus of the embodiment will be described.

In the alignment apparatus 30 of the embodiment, the calculator 36 generates the speed reference signal Va1 for the automatic operation, simultaneously generates the speed reference signals Vm0, Vm1 for the manual operation, and generates the speed reference signal for the electric motor drive unit 50 based on the speed reference signals Va1, Vm0, Vm1. The calculators 32, 34 of the alignment apparatus 30 generate the automatic operation regions based on the position of the self-container 8 and the target position. When the automatic operation regions of the self-container 8 and the target container overlap, respectively, the automatic operation starts. Therefore, the manual operation and the automatic operation can be operated in cooperation. When the automatic operation starts, the self-container 8 can move to be attracted to the target position, and the automatic operation can be performed to smoothly transfer to the manual operation.

Second Embodiment

Figure 5:
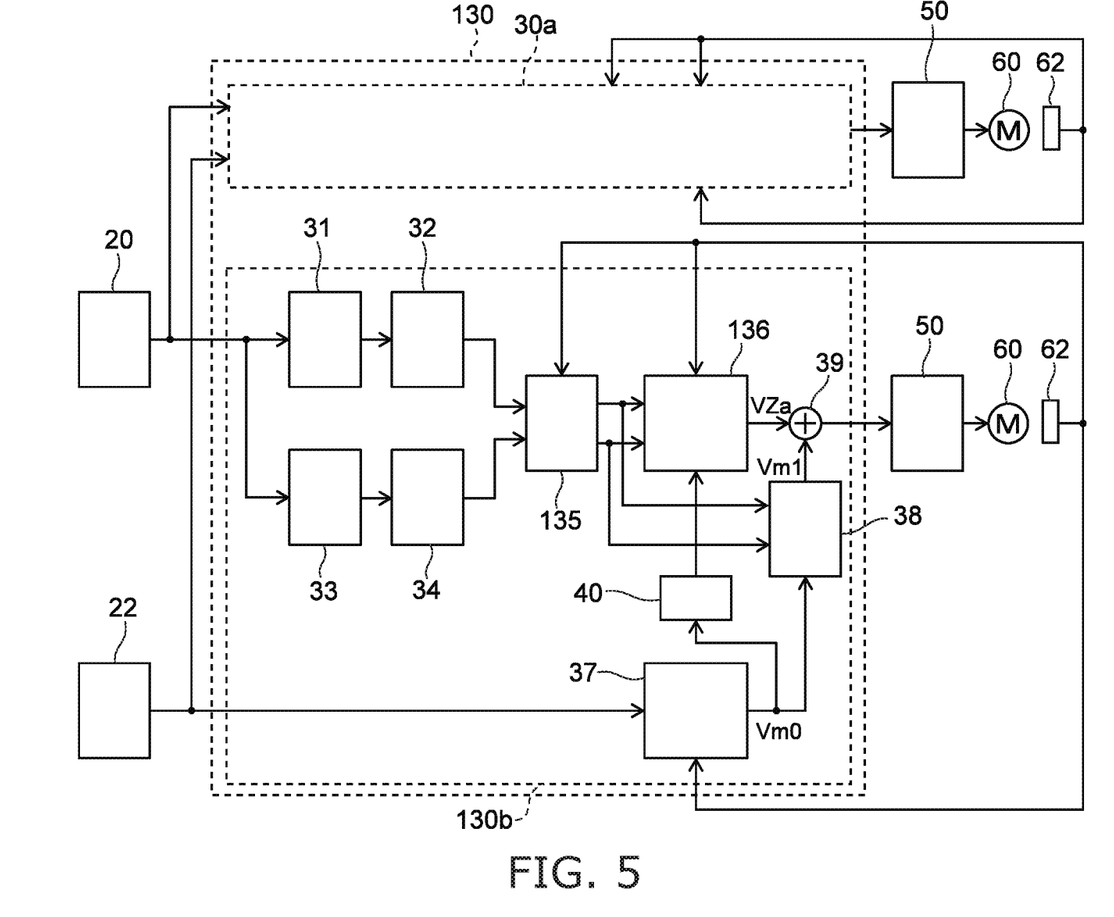
FIG. 5 is a block diagram illustrating an alignment apparatus of the container according to a second embodiment.

FIG. 5 is a block diagram illustrating an alignment apparatus according to the embodiment.

In the case of the embodiment, when the self-container 8 too approaches the container 12 at the target position in the alignment in the Z-axis direction, the alignment apparatus acts so as to keep away the self-container 8 from the target position. Thereby, the alignment apparatus can prevent the self-container 8 from colliding to a side surface of the container 12 at the target position.

An alignment apparatus 130 of the embodiment includes a control circuit 130b of the Z-axis direction. The control circuit 130b of the X-axis direction is the same as the case of the first embodiment.

The control circuit 130b includes the position measuring part 31 of the self-container, the calculator 32 for the automatic operation regions of the self-container, the position measuring part 33 measuring the automatic target position, the calculator 34 for the automatic operation regions of the target position, a determination part 135 for start of the automatic operation, a calculator 136 generating a speed reference signal of the automatic operation, a calculator 37 generating a speed reference signal of the manual operation, and an adder 39. In the case of the embodiment, the determination part 135 and the calculator 136 are different from the case of the first embodiment. The similar components are marked with like reference numerals, and a detailed description is omitted as appropriate.

The determination part 135 for start of the automatic operation determines whether one of the automatic operation regions 10a to 10d of the self-container 8 overlaps one of the automatic operation regions 14a to 14d of the target position or not. In the case where one of the automatic operation regions 10a to 10d of the self-container 8 overlaps one of the automatic operation regions 14a to 14d of the target position, the determination part 135 supplies data of the position of the self-container and the target position to the calculator 136.

The calculator 136 generating the speed reference signal of the automatic operation starts by receiving the data of the position of the self-container 8 and the target position. The calculator generated a speed reference signal VZa which is inversely proportional to the distance LZ between the position of the self-container 8 and the target position and has a direction separating them. In the case where the self-container 8 moves toward a negative direction of the Z-axis by the manual operation, the direction separating the self-container 8 and the target position means that the speed reference signal VZa toward a positive direction of the Z-axis is generated when the automatic operation starts.

The action of the alignment apparatus of the embodiment will be described.

Figure 6:
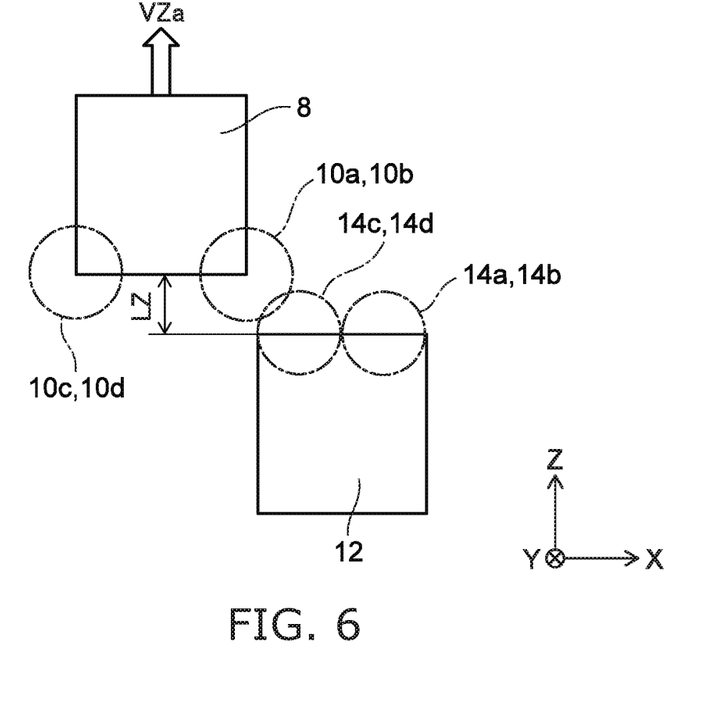
FIG. 6 is a conceptual view for describing the action of the alignment apparatus of the container of the second embodiment.

FIG. 6 is a conceptual view for describing the action of the alignment apparatus of the embodiment.

In FIG. 6, the self-container 8 is located above and on the side of the target container 12. The automatic operation regions 10a, 10b of the self-container 8 overlap the automatic operation regions 14c, 14d of the target container 12. Thereby, the calculator 136 starts, and the alignment apparatus 130 starts the action of the automatic operation. At this time, the speed reference signal VZa generated by the calculator 136 occurs in a direction of an upward arrow in FIG. 6. A size of the speed reference signal VZa is generated so as to be inversely proportional to the distance LZ between the positon on the Z-axis of the self-container 8 and the position on the Z-axis of the target container 12.

As the self-container 8 approaches the target container 12, the self-container 8 is driven in a reverse direction to the approach direction by the large speed reference signal VZa. For that reason, in the automatic operation, the self-container 8 acts so as to oppose the target container 12, when approaching the target container 12.

In the alignment apparatus 130 of the embodiment, in the case where the self-container 8 approaches the side surface of the target container 12, the speed reference signal VZa is generated so as to keep away the self-container 8 from the target container 12. Therefore, it can be prevented that the self-container 8 collides to the side surface of the target container 12.

It is also possible that, for the alignment in the Z-axis direction, both of the control circuit 130b of the embodiment and the control circuit 30b of the first embodiment are mounted on the alignment apparatus, and are used to switch by a switch or the like at the hand of the operator.

Third Embodiment

Figure 7:
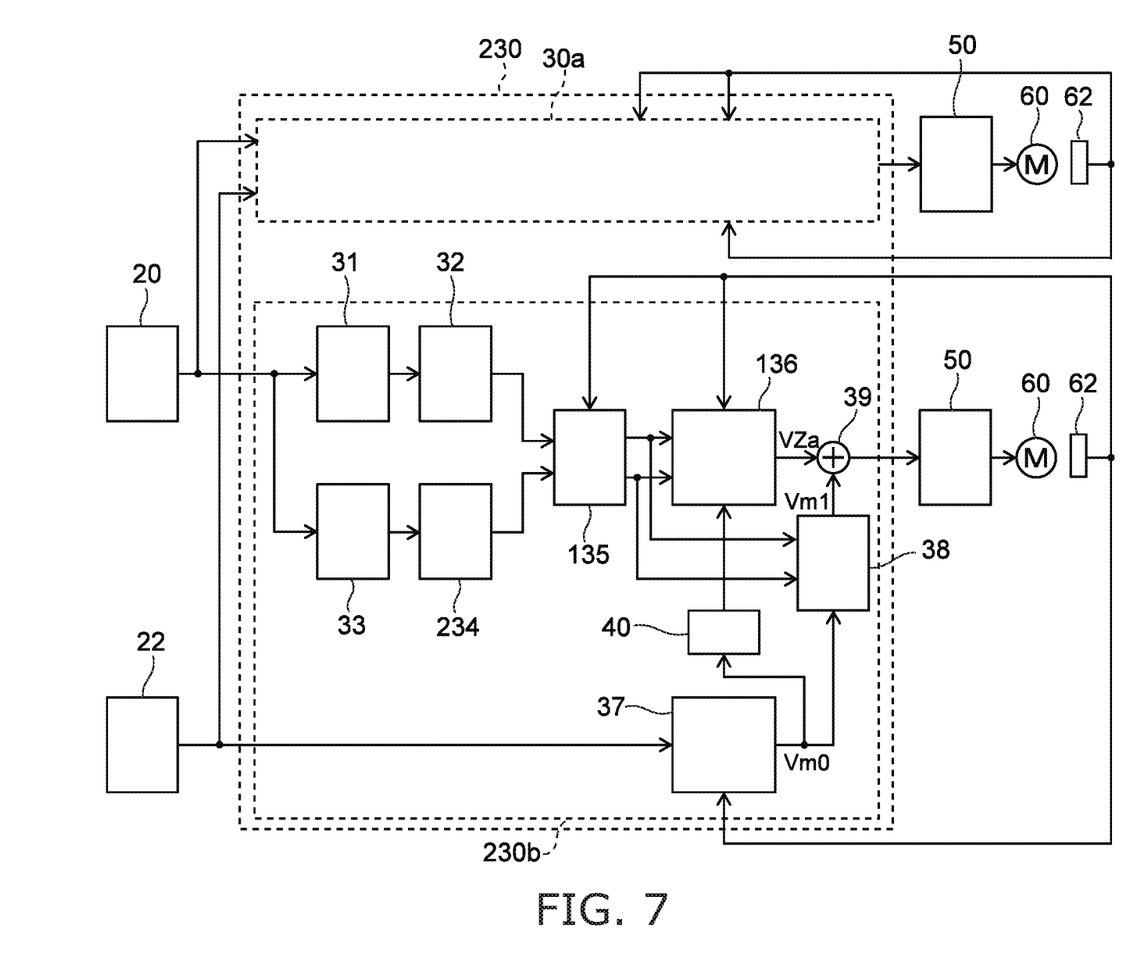
FIG. 7 is a block diagram illustrating an alignment apparatus of a container according to a third embodiment.

FIG. 7 is a block diagram illustrating an alignment apparatus of the embodiment.

Figure 8:
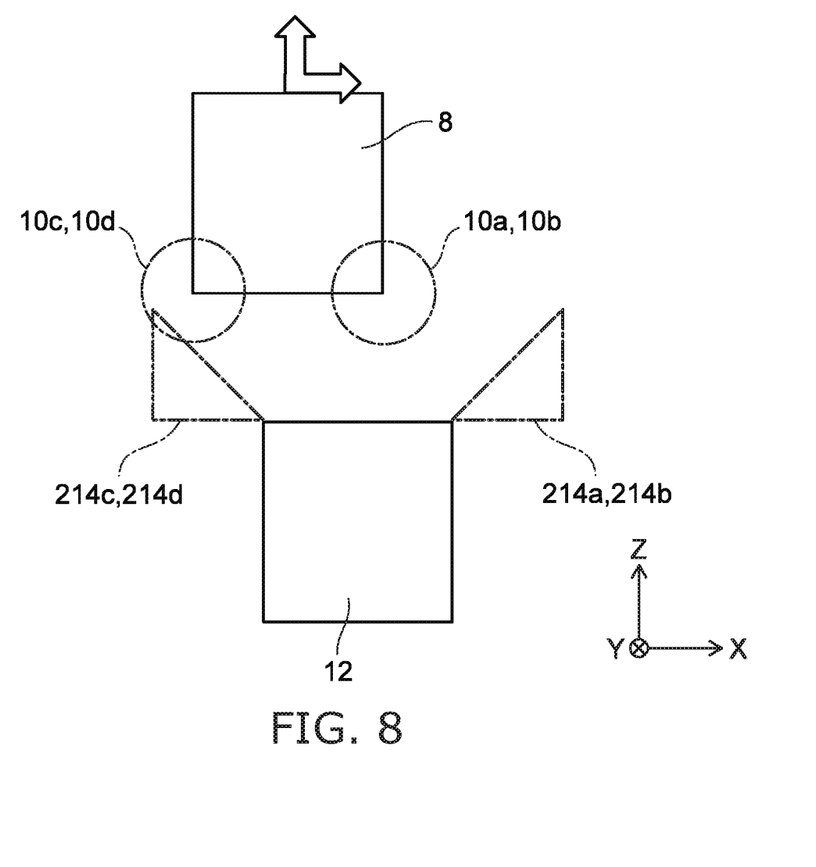
FIG. 8 is a conceptual view for describing the action of the alignment apparatus of the third embodiment.

FIG. 8 is a conceptual view for describing the action of the alignment apparatus of the embodiment.

In the case of the second embodiment, when the distance between the self-container 8 and the target position is close in the Z-axis direction, the speed reference signal is generated so as to keep away each other, and thereby the collision of the both side surfaces is prevented. In the alignment apparatus of the embodiment, the self-container 8 can be aligned to the target position smoothly by changing shapes of the automatic operation regions of the target position.

As shown in FIG. 7, an alignment apparatus 230 includes a control circuit 230b. The control circuit 230b acts for movement in the Z-axis direction. The control circuit 230b includes a calculator 234 in place of the calculator 34 for the automatic operation regions in the case of the second embodiment described above. The similar components are marked with like reference numerals, and a detailed description is omitted as appropriate.

The calculator 234 for the automatic operation regions generates automatic operation regions different from the calculator 34 in the case of the other embodiments described above on the target position.

As shown in FIG. 8, automatic operation regions 214a to 214d of the target container 12 are formed toward the outside from the circumference of the upper surface of the target container 12. Furthermore, boundaries of the automatic operation regions 214a to 214d are formed to stretch toward the above from the upper surface of the target container 12. In this example, the boundaries are formed toward above from the upper surface of the target container 12 by 45°.

The calculator 136 of the control circuit 230b about the Z-axis generates the speed reference signal in a separating direction with a size which is inversely proportional to the distance between the position of the self-container 8 and the position of the target container 12 after starting.

The calculator 136 generates the speed reference signal such as described above, and the calculator 36 of the control circuit 30a about the movement in the X-axis generates the speed reference signal so that the position of the self-container 8 and the target position attract each other. Therefore, the self-container 8 is aligned so as to approach the target position gradually.

For the alignment of the self-container 8, the control circuit 230b of the embodiment may be switched appropriately from the control circuit 30b of the first embodiment and the control circuit 130b of the second embodiment by the switch or the like at the hand of the operator.

According to the embodiment, the alignment apparatus which can align the containers smoothly by using the manual operation and the automatic operation together can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

The invention claimed is:

1. An alignment apparatus of a container performing an alignment of the container by using a manual operation by an operator and an automatic operation without the operator together, the apparatus comprising:
   a first calculator performing calculation measuring a position of the container based on a detection result of a position sensor;
   a second calculator performing calculation measuring a target position based on the detection result of the position sensor, the target container being placed on the target position;
   a third calculator calculating and setting a first automatic operation region performing the automatic operation based on a position of the container and a second automatic operation region performing the automatic operation based on the target position, respectively;
   a first signal generating part detecting overlapping of the first automatic operation region and the second automatic operation region, and generating a first speed reference signal so as to coincide the position of the container with the target position; and
   a second signal generating part generating a second speed reference signal for moving the container based on a manual control signal generated by an operation of an operator,
   a third speed reference signal being generated based on outputs of the first signal generating part and the second signal generating part, and the third speed reference signal being supplied to a drive unit moving the container.

2. The alignment apparatus of the container according to claim 1, wherein
   the first speed reference signal, the second speed reference signal and the third speed reference signal include at least two-dimensional speed vector along a first direction parallel to a plane where the container is placed and a second direction vertical to the first direction, respectively, and
   the third speed reference signal is generated by adding the first speed reference signal and the second reference signal.

3. The alignment apparatus of the container according to claim 2, further comprising:
   a third signal generating part generating a second speed reference signal in the automatic operation region, the second speed reference signal having a size reversely proportional to a distance between the position of the container and the target position, and a direction along which the position of the container approaches the target position.

4. The alignment apparatus of the container according to claim 2, wherein
   the first automatic operation region is set as a region including a corner forming a lower surface of the container and extending in the first direction from the corner outward,
   the second automatic operation region is set as a region extending in the first direction inside the target position, and
   the first speed reference signal has a direction along which the position of the container approaches the target position.

5. The alignment apparatus of the container according to claim 2, wherein
- the first automatic operation region is set as a region including a corner forming a lower surface of the container and extending in the first direction and the second direction from the corner outward,
- the second automatic operation region is set as a region extending in the second direction from the target position outward, and
- the first speed reference signal has a direction along which the position of the container goes away from the target position.

6. The alignment apparatus of the container according to claim 2, wherein
- the first automatic operation region is set as a region including a corner forming a lower surface of the container and extending in the first direction and the second direction from the corner to an outside,
- the second automatic operation region is set as a region extending in the first direction and the second direction from the target position outward, and
- the first speed reference signal has a direction along which the position of the container goes away from the target position.

* * * * *